(12) United States Patent
Tochikawa et al.

(10) Patent No.: US 11,088,630 B2
(45) Date of Patent: Aug. 10, 2021

(54) POWER CONVERTER

(71) Applicant: DENSO CORPORATION, Kariya (JP)

(72) Inventors: Kazuharu Tochikawa, Kariya (JP); Shintaro Kogure, Kariya (JP)

(73) Assignee: DENSO CORPORATION, Kariya (JP)

( * ) Notice: Subject to any disclaimer, the term of this patent is extended or adjusted under 35 U.S.C. 154(b) by 35 days.

(21) Appl. No.: 16/515,394

(22) Filed: Jul. 18, 2019

(65) Prior Publication Data

US 2020/0028444 A1    Jan. 23, 2020

(30) Foreign Application Priority Data

Jul. 19, 2018 (JP) .............................. JP2018-135998

(51) Int. Cl.
*H02M 7/48* (2007.01)

(52) U.S. Cl.
CPC ..................................... *H02M 7/48* (2013.01)

(58) Field of Classification Search
CPC .. H02M 7/48; H02M 1/088; H02M 2001/008; H02M 7/5387; H02M 7/003; H02M 1/008
See application file for complete search history.

(56) References Cited

U.S. PATENT DOCUMENTS

2017/0033704 A1*    2/2017  Lei .......................... H02M 7/003

FOREIGN PATENT DOCUMENTS

| JP | 2005-045185 A |   | 2/2005 |
|----|---------------|---|--------|
| JP | 2005045185    | * | 2/2005 |
| JP | 2011-096809 A |   | 5/2011 |
| JP | 2013-255302 A |   | 12/2013 |
| JP | 2013255302    | * | 12/2013 |
| JP | 2015-210894 A |   | 11/2015 |

* cited by examiner

*Primary Examiner* — Benjamin Tzu-Hung Liu
(74) *Attorney, Agent, or Firm* — Oliff PLC

(57) ABSTRACT

In a power converter, busbars are connected to respective power terminals. The power terminals include at least one narrow power terminal. The at least one narrow power terminal includes a first portion having a first thermal resistance and a first rigidity, and a second portion having a second thermal resistance and a second rigidity, the second thermal resistance being higher than the first thermal resistance, the second rigidity being smaller than the first rigidity.

14 Claims, 11 Drawing Sheets ured along line I-I in FIG. 5, of a power converter according to the first embodiment of the present disclosure;

POWER CONVERTER

CROSS-REFERENCE TO RELATED APPLICATION

This application is based on and claims the benefit of priority from earlier Japanese Patent Application No. 2018-135998 filed Jul. 19, 2018, the description of which is incorporated herein by reference.

TECHNICAL FIELD

The present disclosure relates to power converters each including a semiconductor module that includes a converter component incorporating therein a semiconductor element, and power terminals protruding from the converter component.

BACKGROUND

A known power converter includes a semiconductor module that includes a converter component incorporating therein one or more semiconductor elements, such as IGBTs, and power terminals protruding from the converter component. Busbars are connected to the respective power terminals.

SUMMARY

According to a first exemplary aspect of the present disclosure, there is provided a power converter. The power converter includes a semiconductor module.
The semiconductor module includes a plurality of power terminals protruding from a converter component in a first direction serving as a protrusion direction, and each having a predetermined thickness in a second direction serving as a thickness direction. The power terminals include at least one narrow power terminal. The at least one narrow power terminal includes a first portion having a first thermal resistance and a first rigidity, and a second portion having a second thermal resistance and a second rigidity. The second thermal resistance is higher than the first thermal resistance, and the second rigidity is smaller than the first rigidity.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

View Point

Figure 1:
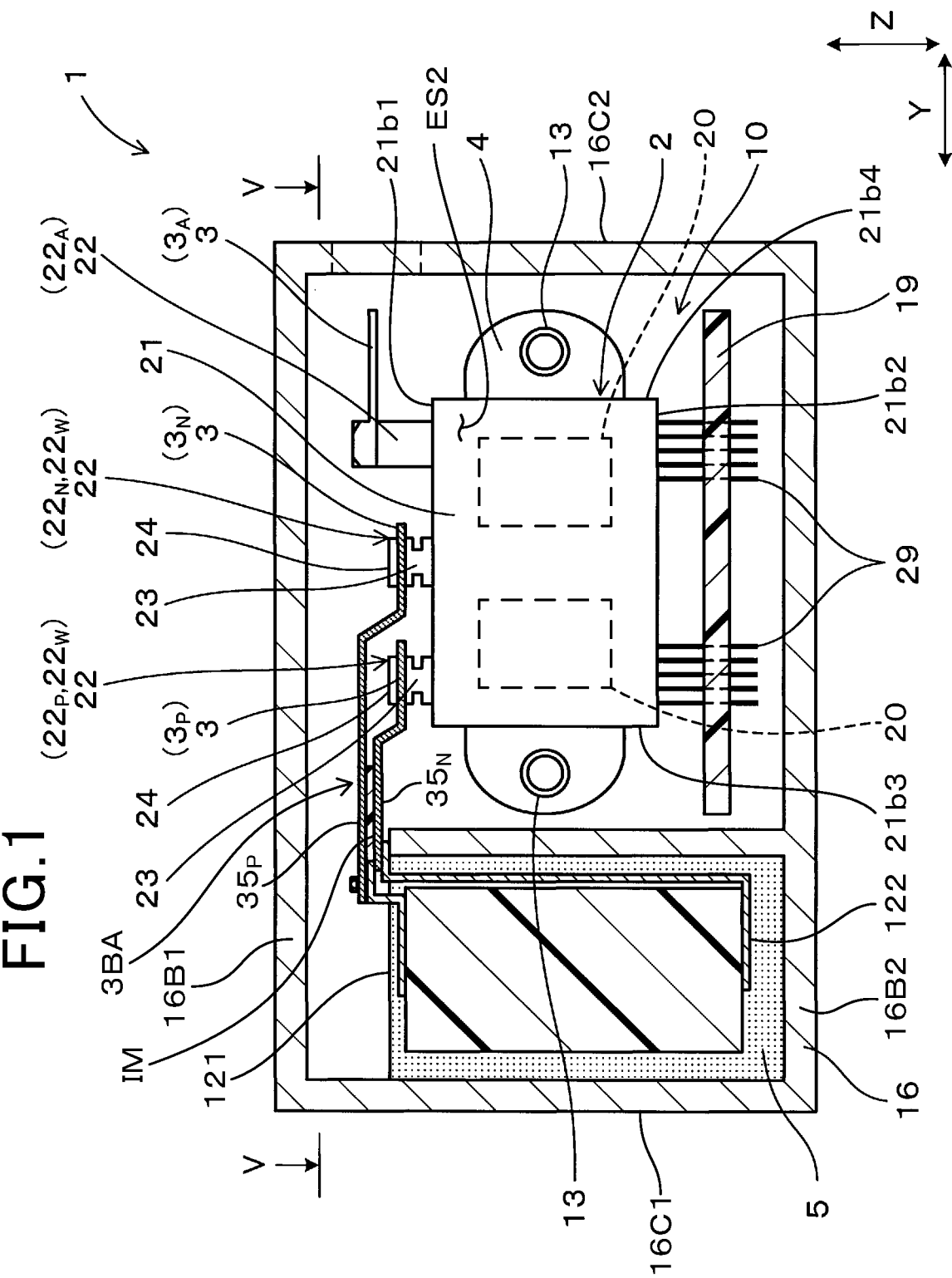
FIG. 1 is a cross-sectional view, which is taken along line I-I in FIG. 5, of a power converter according to the first embodiment of the present disclosure.

A known power converter, an example of which is disclosed in Japanese Patent Application Publication No. 2005-45185, includes a semiconductor module that includes a converter component incorporating therein one or more semiconductor elements, such as IGBTs, and power terminals protruding from the converter component. Busbars are connected to the respective power terminals. The semiconductor module is electrically connected via the bus bars to a direct-current (DC) power source, alternating-current (AC) loads, and other similar electrical loads. The power terminals are joined to the respective bus bars by, for example, welding or soldering.

Such a power converter is configured to control on-off switching operations of the one or more semiconductor elements to thereby convert DC power supplied from the DC power source into AC power.

A parasitic inductance in, for example, each of the power terminals may cause a surge when the one or more switching elements are switched on or off.

In recent years, shortening the length of each power terminal has been considered to thereby reduce the parasitic inductance in the corresponding power terminal.

The reduced length of each power terminal however may be likely to reduce the thermal resistance of the corresponding power terminal.

Thus, for joining the power terminals to the respective busbars by, for example, welding during a manufacturing process of the power converter, heat is likely to be transferred to the one or more semiconductor elements through the power terminals. This may result in the characteristics of the one or more semiconductor elements varying. From this viewpoint, it is desirable to provide power converters, each of which is configured such that heat due to the joint forming process is less likely to be transferred to the one or more semiconductor elements.

In addition, the reduction in the length of each power terminal may cause the rigidity of the corresponding power terminal to be likely to increase.

Thus, the increased rigidity of each power terminal may result in bending being less likely when external vibration is applied to the power converter, causing stress to be likely applied to the joint portions between the busbar and the power terminals.

From this viewpoint, it is also desirable to provide power converters, each of which is configured to restrict transfer of stress to the joint portions between the busbar and the power terminals.

In view of these desires, the present disclosure seeks to provide power converters, each of which is capable of reducing transfer of heat to a semiconductor element included in a semiconductor module and/or reducing transfer of stress to the joint portions between power terminals and a busbar.

According to a first exemplary aspect of the present disclosure, there is provided a power converter. The power converter includes a semiconductor module. The semiconductor module includes a converter component that includes at least one semiconductor element for power conversion, and a plurality of power terminals protruding from the converter component in a first direction serving as a protrusion direction, and each having a predetermined thickness in a second direction serving as a thickness direction. The power converter includes a plurality of busbars connected to the respective power terminals. The power terminals include at least one narrow power terminal. The at least one narrow power terminal includes a first portion having a first thermal resistance and a first rigidity, and a second portion having a second thermal resistance and a second rigidity. The second thermal resistance is higher than the first thermal resistance, and the second rigidity is smaller than the first rigidity.

This configuration of the power converter enables the second portion of the at least one power terminal to have the second thermal resistance higher than the first thermal resistance of the first portion. Accordingly, heat is less likely to be transferred to the semiconductor element through the second portion. This results in a reduction in disadvantageous variations in the characteristics of the semiconductor element.

This configuration of the power converter enables the second portion of the at least one power terminal to have the second rigidity lower than the first rigidity of the first portion. Accordingly, even if external vibration is applied to the power converter, the second portion is easily bent, so that large stress is less likely to be applied to a joint portion between the at least one narrow power terminal and the corresponding at least one power terminal.

Embodiment

The following describes power converters, which are embodiments of the present disclosure, with reference to the accompanying drawings. In the embodiments, similar or equivalent parts between the embodiments, to which like reference characters are assigned, are omitted or simplified to avoid redundant description.

First Embodiment

The following describes a power converter 1 according to the first embodiment of the present disclosure with reference to FIGS. 1 to 8.

The power converter 1 of the first embodiment serves as, for example, a power converter to be mounted in a vehicle, such as an electric vehicle or a hybrid vehicle.

Figure 7:
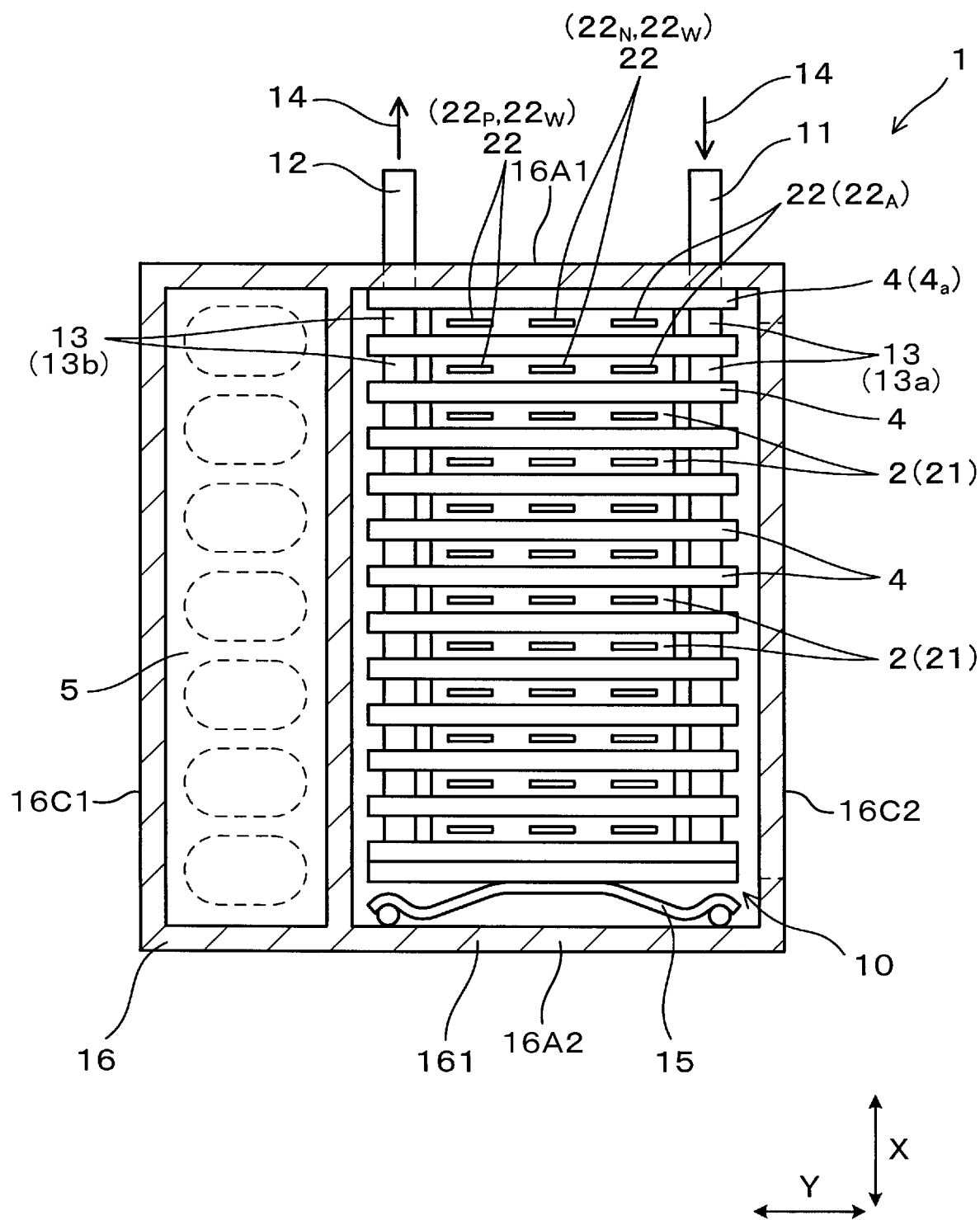
FIG. 7 is a view corresponding to FIG. 6 from which a positive busbar has been removed.

As illustrated in, for example, FIGS. 1 and 7, the power converter 1 includes a stack assembly 10, a DC busbar assembly 3BA comprised of a pair of DC busbars $3_P$ and $3_N$, an AC busbar $3_A$, a control circuit board 19, a smoothing capacitor 5, and a housing 16. Note that the busbars 3 ($3_P$, $3_N$, $3_A$) can be collectively called "busbars 3" or "busbars 3 ($3_P$, $3_N$, $3_A$), or also individually called "busbars $3_P$, $3_N$, $3_A$" hereinafter.

The stack assembly 10 includes a plurality of semiconductor modules 2 and a plurality of cooling pipes 4. The stack assembly 10 is configured such that the semiconductor modules 2 and the cooling pipes 4 are alternately stacked in a predetermined direction, which will be referred to as a thickness direction or an X direction, to have a stack structure. The stack assembly 10 has opposing first and second end surfaces ES1 and ES2 in the X direction.

The smoothing capacitor 5 has opposing positive and negative electrodes 121 and 122 that face each other with a predetermined space therebetween.

The housing 16 has a substantially rectangular parallelepiped shape having a first pair of opposing sidewalls 16A1 and 16A2, a second pair of sidewalls 16B1 and 16B2, and a third pair of sidewalls 16C1 and 16C2. For example, the stack assembly 10 is disposed in the housing 16 such that the first and second surfaces ES1 and ES2 of the stack assembly 10 face the respective sidewalls 16A1 and 16A2, and are disposed to be perpendicular to the X direction (stack direction) (see, for example, FIGS. 1 and 5.

The stack assembly 10 and the smoothing capacitor 5 are disposed to be aligned in a direction, which will be referred to a Y direction, that is perpendicular to the X direction. The direction perpendicular to the X direction and Y direction will be defined as a Z direction hereinafter; the relationship of these X-Z directions is illustrated in, for example, FIG. 1.

Figure 8:
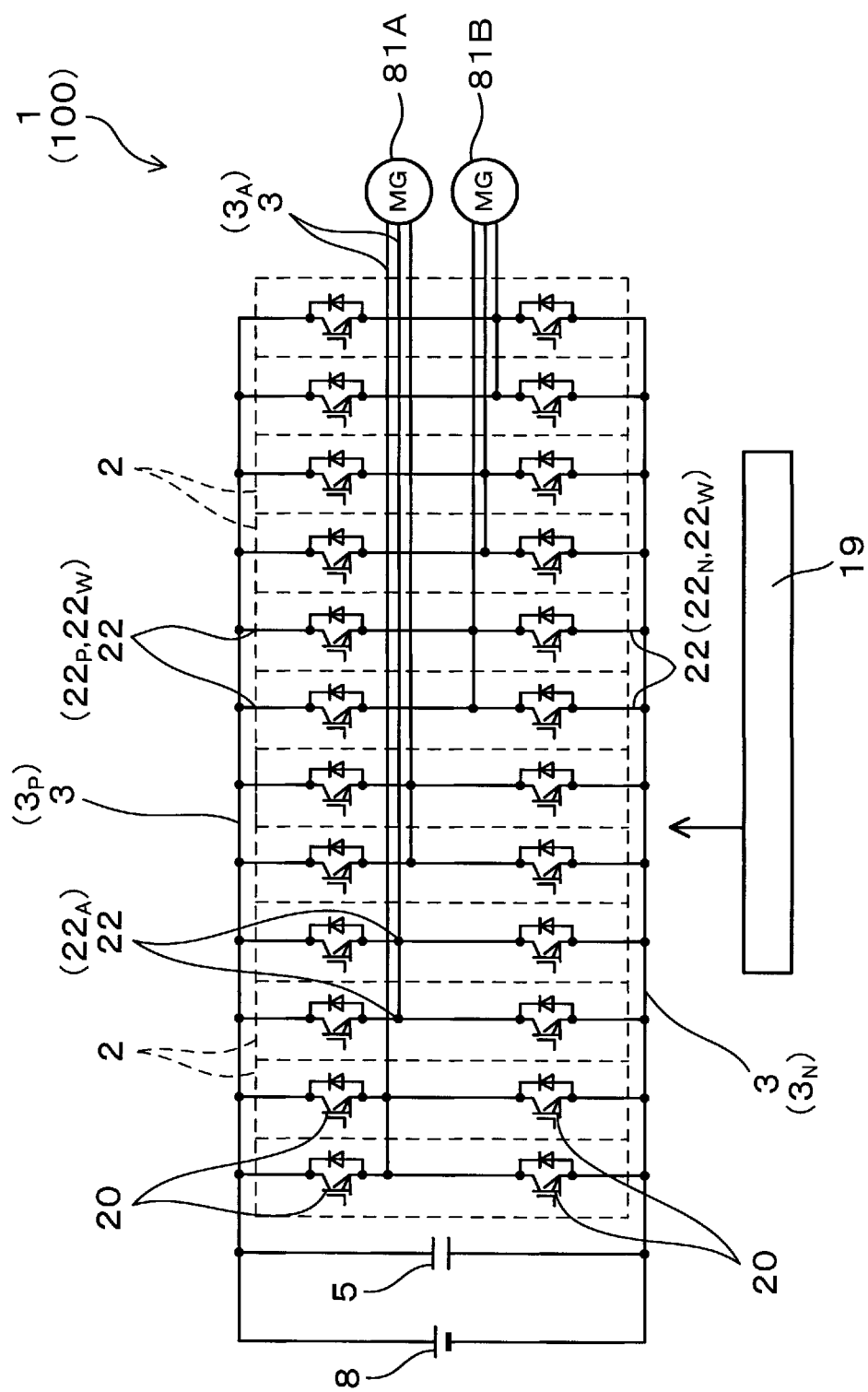
FIG. 8 is a circuit diagram of the power converter illustrated in FIG. 1.

Each of the semiconductor modules 2 incorporates therein a plurality of semiconductor elements 20 (see FIGS. 1 and 8). The cooling pipes 4 cool the semiconductor modules 2. The DC busbars $3_P$ and $3_N$ serve as a current path between a DC power source 8 and the semiconductor modules 2, and the AC busbar $3_A$ serves as a current path between the semiconductor modules 2 and first and second three-phase AC motors 81A and 81B described later.

Specifically, the DC power source 8 has opposing positive and negative terminals 8a and 8b; the positive terminal 8a of the DC power source 8 is connected to the positive electrode 120 of the smoothing capacitor 5, and the positive electrode 121 of the smoothing capacitor 5 is connected to the DC busbar $3_P$ (see FIG. 8). Additionally, the negative terminal 8b of the DC power source 8 is connected to the negative electrode 121 of the smoothing capacitor 5, and the negative electrode 121 of the smoothing capacitor 5 is connected to the DC busbar $3_N$.

The stack assembly 10, the DC busbars 3, the smoothing capacitor 5, and the control circuit board 19 are installed in the housing 16 (see, for example, FIG. 1).

Figure 2:
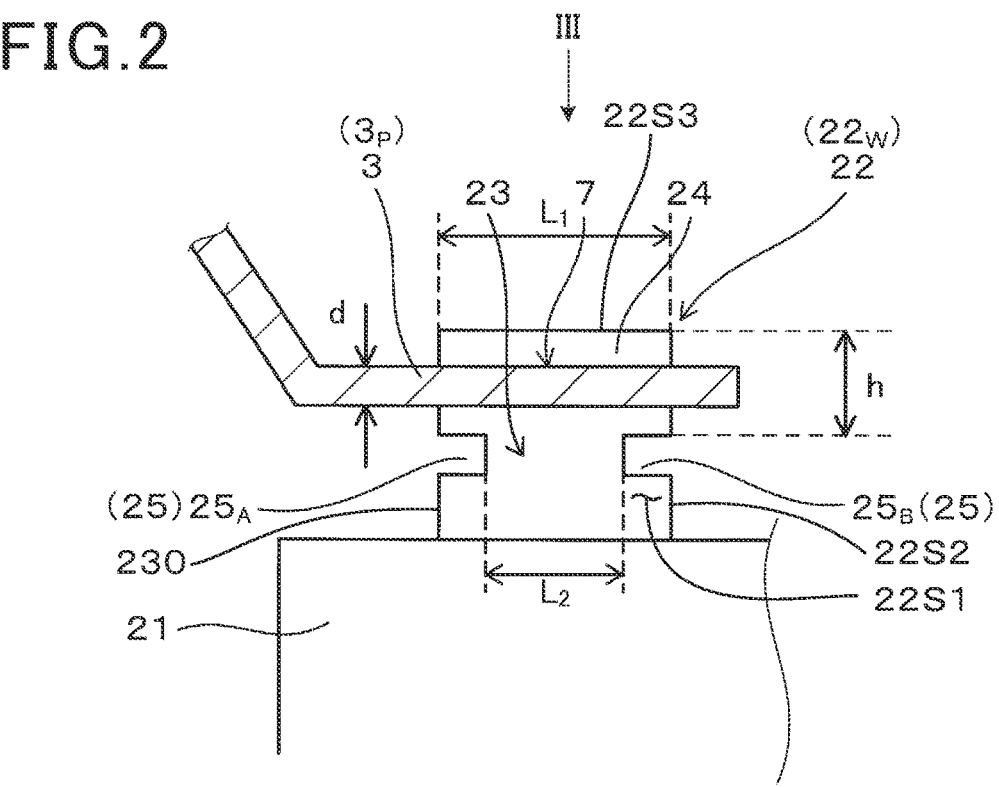
FIG. 2 is an enlarged view of principal components of the power converter illustrated in FIG. 1.

As illustrated in FIG. 1 and FIG. 2, each semiconductor module 2 includes a converter component 21 incorporating therein the semiconductor elements 20, power terminals 22 ($22_P$, $22_N$, $22_A$) protruding from the converter component 21 and connected to the respective busbars 3 ($3_P$, $3_N$, $3_A$).

The power terminals 22 include DC terminals $22_P$ and $22_N$ connected to the respective DC busbars $3_P$ and $3_N$, and an AC terminal $22_A$ connected to the AC busbar $3_A$.

Each of the power terminals 22 has a substantially rectangular thin-plate shape, and has a pair of opposing major sides 22s1, a pair of opposing minor sides 22s2, and an end side 22s3 (see FIG. 2).

At least one of the power terminals 22 is configured as a narrow power terminal $22_W$ that is comprised of a base portion 230, a narrow portion 23 and a wide end portion 24. For example, each of the DC terminals 22 is configured as the narrow power terminal, and the AC terminal $22_A$ is configured to have a substantially rectangular-parallelepiped shape without having a narrow portion.

Specifically, the converter component 21 of each semiconductor module 2 is comprised of a substantially rectangular parallelepiped case 21a in which the semiconductor elements 20 are installed. The case 21a of the converter component 21 has opposing major surfaces, opposing major sides, i.e. longitudinal sides, 21b1 and 21b2, and has opposing minor sides, i.e. lateral sides, 21b3 and 21b4. For example, the case 21a of the converter component 21 is arranged such that (1) The major sides 21b1 and 21b2 face the respective sidewalls 16B1 and 16B2 of the housing 16

(2) The minor sides 21b3 and 21b4 face the respective sidewalls 16C1 and 16C2 of the housing 16

The major side 21b1 has opposing first and second ends in the Y direction, and a middle portion between both the first and second ends.

The base portion 230 of the narrow power terminal $22_W$ has opposing first and second ends in the Z direction, and the first end of the base portion 230 is joined to the first end of the major side 21b1 so as to protrude from the first end of the major side 21b1. That is, the base portion 230 extends from the first end of the major side 21b1 by a predetermined length in the Z direction, which serves as, for example, a protrusion direction, toward the sidewall 16B1 of the housing 16; the first end is closer to the smoothing capacitor 5 than the second end is. The base portion 230 has a width, i.e. a length, L1 in the Y direction.

The narrow portion 23 of the narrow power terminal $22_W$ has opposing first and second ends in the Z direction. The first end of the narrow portion 23 is joined to the second end of the base portion 230 so as to continuously extend from the second end of the base portion 230 by a predetermined length in the Z direction toward the sidewall 16B1 of the housing 16. The narrow portion 23 has a width, i.e. a length, L2 in the Y direction, which is smaller than the width L1 of the base portion 230.

The wide end portion 24 of the narrow power terminal $22_W$ has opposing first and second ends in the Z direction. The first end of the wide end portion 24 is joined to the second end of the narrow portion 23 so as to continuously extend from the second end of the narrow portion 23 by a predetermined length in the Z direction toward the sidewall 16B1 of the housing 16. The wide end portion 24 has, for example, the same width L1 as the width L1 of the base portion 230. The wide end portion 24 of the narrow power terminal $22_W$ is joined to the corresponding one of the busbars 3.

In other words, the width L2 of the narrow portion 23 of the narrow power terminal $22_W$ is smaller than the width L1 of each of the base portion 230 and the wide end portion 24 in a width direction, i.e. the Y direction, perpendicular to the thickness direction X and the protrusion direction Z of the narrow power terminal $22_W$.

Additionally, the AC terminal $22_A$ has no narrow portions, and is configured to protrude from the second end of the major side 21b1 to extend by a predetermined length in the Z direction toward the sidewall 16B1 of the housing 16. The AC terminal $22_A$ is joined to an AC busbar $3_A$.

Additionally, each semiconductor module 2 includes control terminals 29 each having a first end connected to the corresponding one of the semiconductor elements 20 installed in the corresponding semiconductor module 2. Each of the control terminals 29 has a second end, which is opposite to the first end, is for example configured to protrude from the major side 21b2 of the corresponding case 21a to extend by a predetermined length in the Z direction toward the sidewall 16B2 of the housing 16. The second ends of the control terminals 29 of each semiconductor module 2 are connected to the control circuit board 19. That is, the control terminals of the respective semiconductor elements 20 installed in the stack assembly 10 are connected to the control circuit board 19.

For example, as illustrated in FIG. 8, the number of the semiconductor modules 2 is set to 12, and each of the semiconductor modules 2 is comprised of (1) A first semiconductor element 20 comprised of an upper-arm semiconductor switch, such as an IGBT, and a flyback diode connected in antiparallel thereto (2) A second semiconductor element 20 comprised of a lower-arm semiconductor switch, such as an IGBT, and a flyback diode connected in antiparallel thereto; the first and second semiconductor elements 20 are connected in series to each other The twelve semiconductor modules 2 include a first group of semiconductor modules 2 for a first three-phase AC motor-generator (MG) 81A, and a second group of semiconductor modules 2 for a second three-phase AC motor-generator 81B. That is, the AC terminals $22_A$ of the respective semiconductor modules 2 of the first group are connected to the first three-phase AC motor-generator 81A via AC busbars $3_A$. Similarly, the AC terminals $22_A$ of the respective semiconductor modules 2 of the second group are connected to the second three-phase AC motor-generator 81B via AC busbars 3A.

That is, the control circuit board 19 is configured to control (1) On-off switching operations of each semiconductor switch included in the first group of the semiconductor modules 2 to thereby enable the power converter 1 to convert DC power supplied from the DC power source 8 into AC power, and supply the AC power to the first three-phase AC motor-generator 82A (2) On-off switching operations of each semiconductor switch included in the second group of the semiconductor modules 2 to thereby enable the power converter 1 to convert the DC power supplied from the DC power source 8 into AC power, and supply the AC power to the second three-phase AC motor-generator 82B Supplying the AC power to each of the first and second three-phase AC motor-generators 81A and 81B causes the vehicle to travel As illustrated in FIG. 1, the power terminals 22 of each semiconductor module 2 include the DC terminals, i.e. positive and negative power terminals, $22_P$ and $22_N$, and the AC power terminal $22_A$. Similarly, the busbars 2 include the DC busbars, i.e. positive and negative busbars $3_P$ and $3_N$, and the AC busbar $3_A$.

The positive power terminal $22_P$ is joined to the positive busbar $3_P$, so that the positive power terminal $22_P$ is electrically connected to the positive electrode 121 of the smoothing capacitor 5 and the positive terminal 8a of the DC power source 8. Similarly, the negative power terminal $22_N$ is joined to the negative busbar $3_N$, so that the negative power terminal $22_N$ is electrically connected to the negative electrode 122 of the smoothing capacitor 5 and the negative terminal 8b of the DC power source 8. Additionally, the AC power terminal $22_A$ is connected to the AC busbar $3_A$.

As described above, as illustrated in FIG. 6, the stack assembly 10 is configured such that the semiconductor modules 2 and the cooling pipes 4 are alternately stacked in the X direction, i.e. the stack direction, to have a stack structure.

That is, the power converter 1 includes cooling mechanism CM, which is comprised of the cooling pipes 4 and joint pipes 13, for cooling the semiconductor modules 2.

Specifically, each of the cooling pipes 4 has a substantially rectangular plate-like shape, and has a longitudinal length in the Y direction longer than the longitudinal length of each semiconductor module 2 in the Y direction. Referring to FIG. 7, the semiconductor modules 2 and the cooling pips 11 are alternately arranged in the X direction to constitute the stack assembly 10 such that two cooling pipes 4a and 4b are located at both ends of the stack assembly 10 in the X direction.

Each of the cooling pipes 4 has opposing first and second ends in its longitudinal direction, i.e. the Y direction. The joint pipes 13 include first joint pipes 13a communicably connecting the first ends of the cooling pipes 4, and second joint pipes 13b communicably connecting the second ends of the cooling pipes 4. The cooling mechanism CM is arranged such that the second ends of the cooling pipes 4, which are joined by the joint pipes 13b, are located to be closer to the capacitor 12 than the first ends of the cooling pipes 4 are.

Referring to FIG. 7, the power converter 1 includes an introduction pipe 11 and an exhaust pipe 12. The cooling pipe 4a is located to be closer to the sidewall 16A1 of the housing 16 than the cooling pipe 4b is. In particular, the cooling pipe 4a is in direct contact with the sidewall 16A1 of the housing 16.

The introduction pipe 11 airtightly penetrates through the sidewall 16A1 of the housing 16 to be communicably connected to the first end of the cooling pipe 4a of the cooling mechanism CM. The exhaust pipe 12 is airtightly penetrated through the sidewall 16A1 of the housing 16 to be communicably connected to the second end of the cooling pipe 4a of the cooling mechanism CM. When a predetermined refrigerant, i.e. a coolant, 14 is introduced into the introduction pipe 11, the refrigerant 14 flows into all the cooling pipes 4 from their first ends via the first joint pipes 13a, and reaches the second ends of all the cooling pipes 4. Thereafter, the refrigerant 14 flows through the second joint pipes 13b to be exhausted from the exhaust pipe 12. That is, introduction of the refrigerant 14 into the cooling pipes 4 and exhaust of the refrigerant 14 from the cooling pipes 4 are repeatedly carried out, resulting in cooling of the semiconductor modules 2.

The power converter 1 includes a pressing member 15 located between the cooling pipe 11b of the cooling mechanism CM and the inner surface of the sidewall 16A2 of the housing 16. For example, a leaf spring is used as the pressing member 15. Specifically, the pressing member 15 elastically presses the cooling pipe 11b to the opposing sidewall 16A1 of the housing 16 in the X direction, i.e. the stack direction of the semiconductor modules 2 to thereby fixedly fasten the stack assembly 10 to the housing 16 while ensuring contact pressure between each semiconductor module 2 and a corresponding pair of cooling pipes 4 adjacent to the semiconductor module 2.

The DC busbar assembly 3BA are arranged to extend between the DC terminals $22_P$ and $22_N$ of the semiconductor modules 2 and the smoothing capacitor 12 in the Y direction to electrically couple the DC terminals $22_P$ and $22_N$ and the smoothing capacitor 12.

Specifically, the DC busbar assembly 3BA is comprised of the positive busbar $3_P$ and the negative busbar $3_N$, each of which has a plate-like shape and has opposing first and second ends in the Y direction, so that the first end of each of the positive and negative busbars $3_P$ and $3_N$ is closer to the smoothing capacitor 12 than the second end thereof is. The DC busbar assembly 3BA is also comprised of an insulation member IM interposed between a portion of the first end of the positive busbar $3_P$ and a portion of the first end of the negative busbar $3_N$, so that the portion of the first end of the positive busbar $3_P$ and the portion of the first end of the negative busbar $3_N$ are overlapped with each other in the Z direction. The portion of the first end of the positive busbar $3_P$ and the portion of the first end of the negative busbar $3_N$, which are overlapped with each other in the Z direction, will be referred to as, for example, overlap portions $35_P$ and $35_N$. That is, the overlap portions 30 of the positive and negative busbars $35_P$ and $35_N$ are arranged to be closer to the positive power terminal $22_P$ of each semiconductor module 2 than to the positive negative terminal $22_N$ thereof.

Each of the positive and negative busbars $3_P$ and $3_N$ is folded at its middle portion so as to be joined to the corresponding one of the positive and negative power terminals $22_P$ and $22_N$.

As illustrated in FIG. 2, each of the narrow power terminals $22_W$, i.e. each of the positive and negative power terminals $22_P$ and $22_N$, is comprised of (1) A first groove $25_A$ formed in one of the minor sides 22s2 of the corresponding narrow power terminal $22_W$ located to be closer to the overlap portions 30 than the other thereof is (2) A second groove 25B formed in the other of the minor sides 22s2 of the corresponding narrow power terminal $22_W$ Each of the first and second grooves $25_A$ and $25_B$ extends in the X direction, and has a substantially rectangular shape in a cross section along the Y-Z plane.

The opening of the first groove $25_A$, i.e. notched first groove $25_A$, is directed toward the overlap portions 30 of the positive and negative busbars $3_P$ and $3_N$ in the Y direction, and the opening of the first groove $25_B$ i.e. notched first groove $25_B$ is directed toward the AC terminal $22_A$ in the Y direction.

That is, the first and second grooves $25_A$ and $25_B$ constitute the narrow portion 23 therebetween in the Y direction.

As described above, the wide end portion 24 of each of the positive and negative power terminals $22_P$ and $22_N$ is joined to the corresponding one of the positive and negative busbars $3_P$ and $3_N$. For example, the wide end portion 24 of each of the positive and negative power terminals $22_P$ and $22_N$ is welded to the corresponding one of the positive and negative busbars $3_P$ and $3_N$.

Each of the positive and negative busbars $3_P$ and $3_N$ includes a joint portion joined to the wide end portion 24, and the portion has a thickness d in a direction corresponding to the Z direction, i.e. the protrusion direction. The wide end portion 24 has a length h in the Z direction, and the joint portion of each of the positive and negative busbars $3_P$ and $3_N$, which is joined to wide end portion 24, has the thickness d in the Z direction; the length h is set to be longer than the length d.

Figure 3:
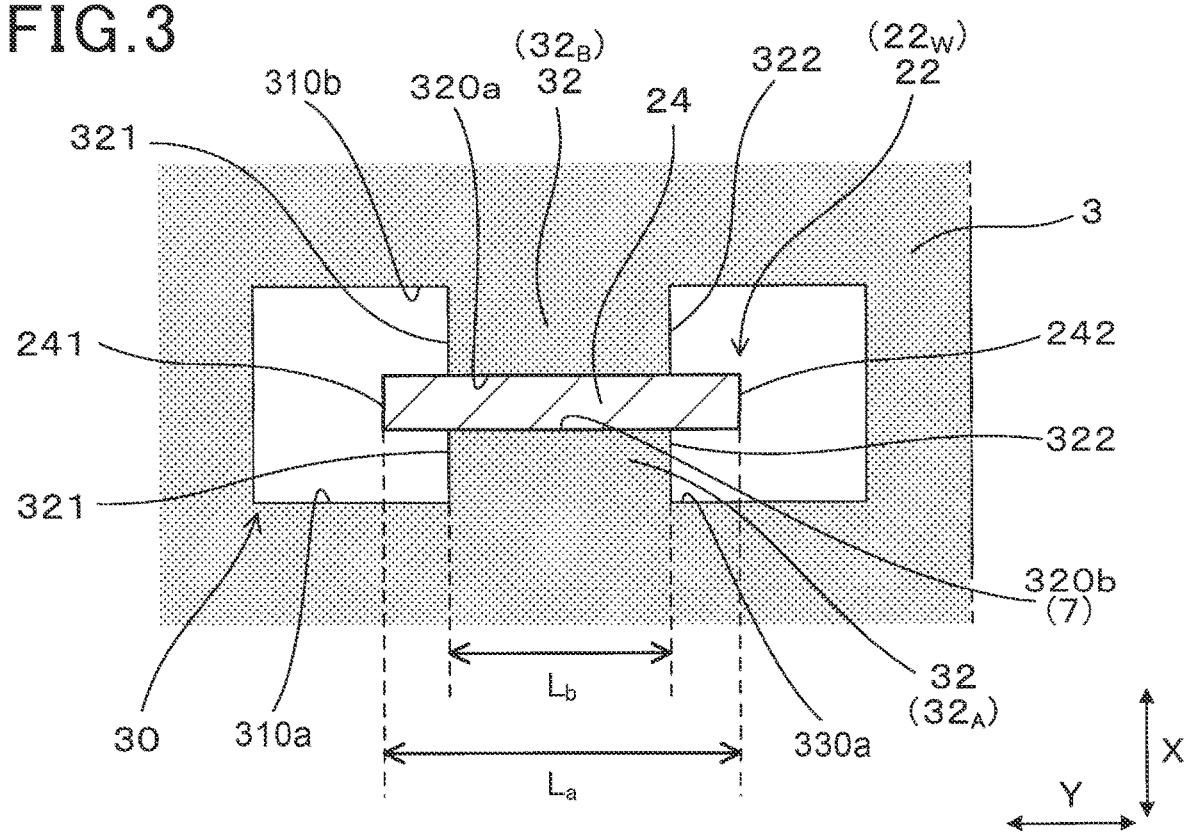
FIG. 3 is a view corresponding to FIG. 2 as viewed from a direction indicated by arrow III.
Figure 4:
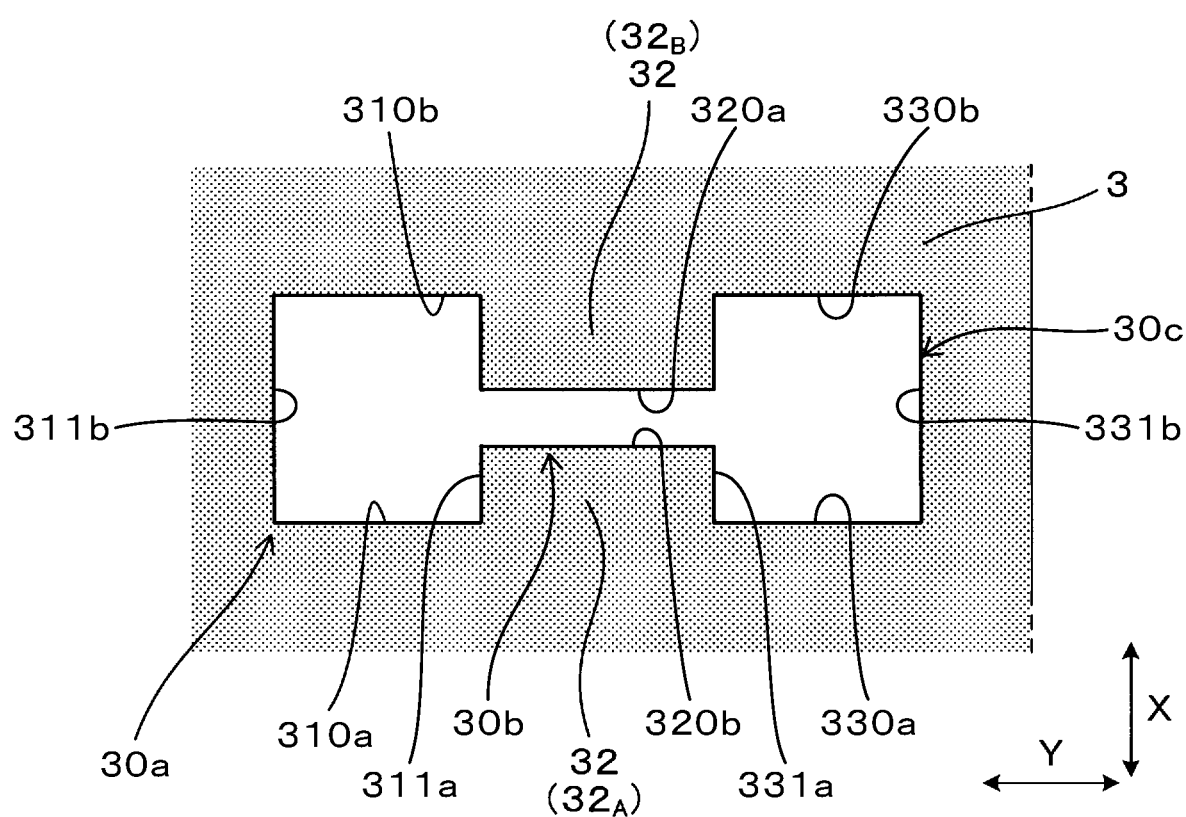
FIG. 4 is a view corresponding to FIG. 3 from which a narrow power terminal has been removed.
Figure 5:
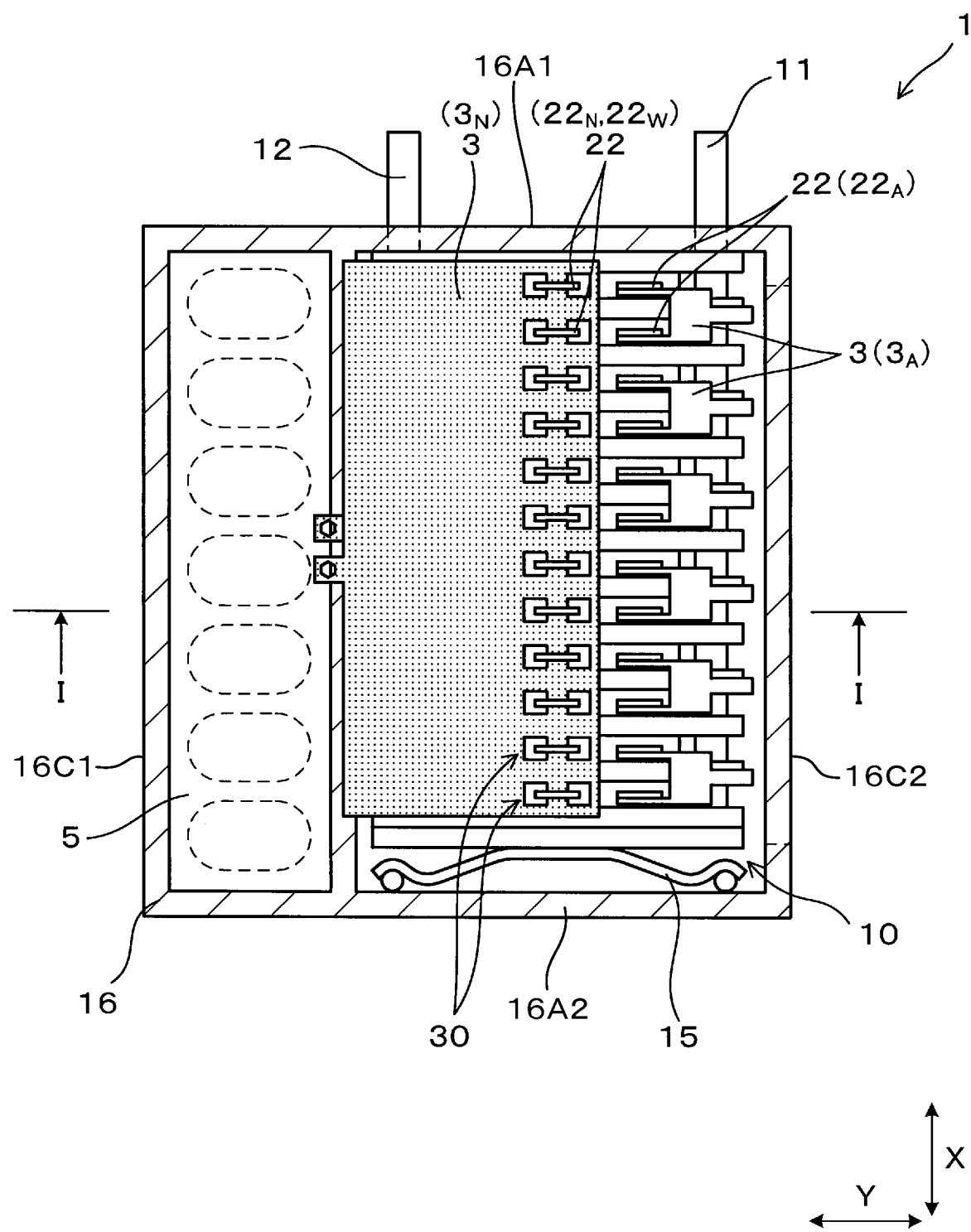
FIG. 5 is a cross-sectional view taken along line V-V in FIG. 1.
Figure 6:
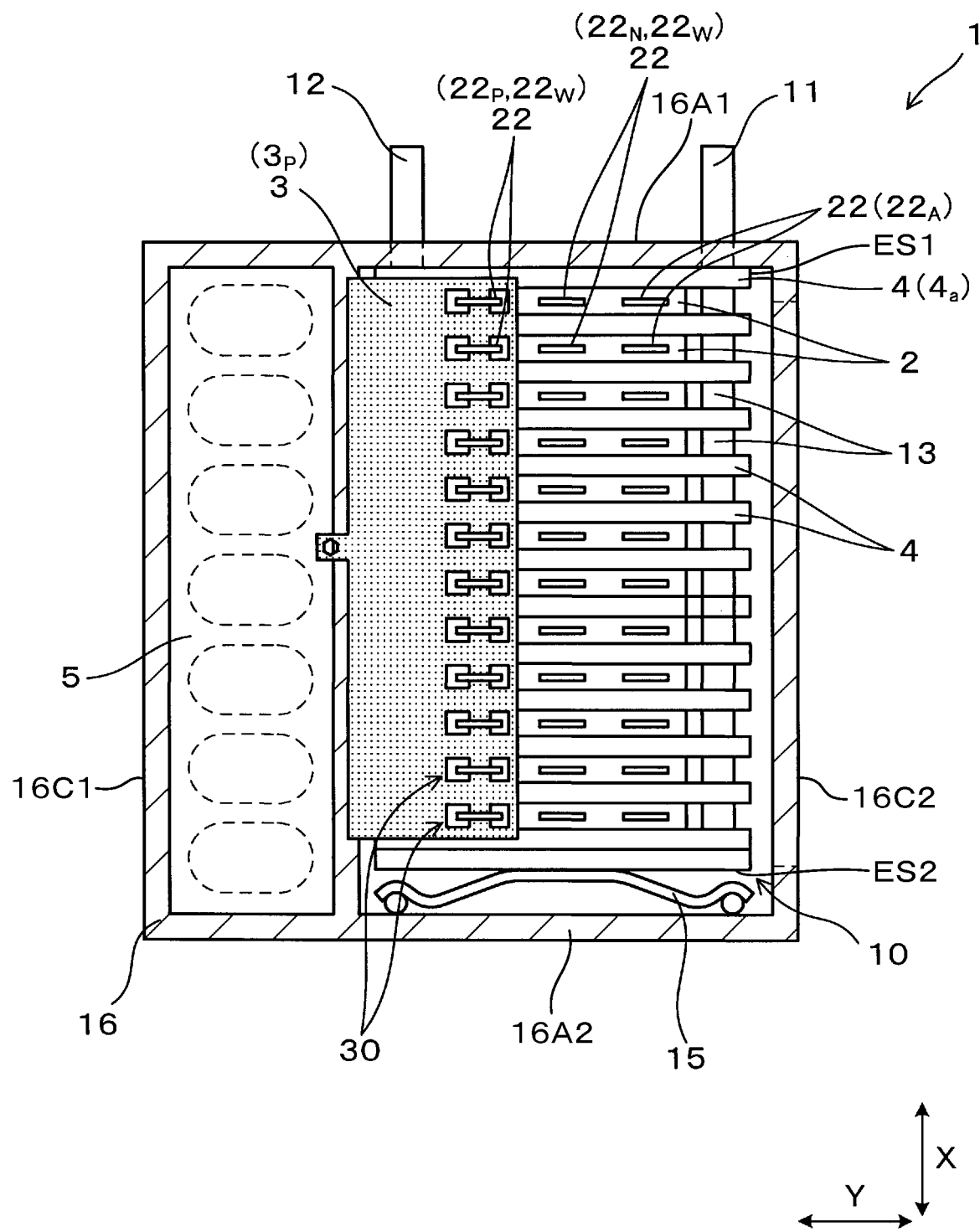
FIG. 6 is a view corresponding to FIG. 5 from which a negative busbar and an AC busbar have been removed.

As illustrated in FIGS. 3 and 4, the second end of the positive busbar $3_P$ has terminal insertion holes 30 each formed therethrough in the Z direction; the terminal insertion holes 30 are provided for the positive power terminals $22_P$ of the respective semiconductor modules 2. Similarly, the second end of the negative busbar $3_N$ has terminal insertion holes 30 each formed therethrough in the Z direction; the terminal insertion holes 30 are provided for the negative power terminals $22_N$ of the respective semiconductor modules 2.

That is, while the wide end portion 24 of each of the positive power terminals $22_P$ is filled in or held in the corresponding one of the terminal insertion holes 30 of the positive busbar $3_P$, the wide end portion 24 is welded to the second end of the positive busbar $3_P$. Similarly, while the wide end portion 24 of each of the negative power terminals $22_N$ is filled in or disposed in the corresponding one of the terminal insertion holes 30 of the negative busbar $3_N$, the wide end portion 24 is welded to the second end of the negative busbar $3_N$.

Specifically, as illustrated in each of FIGS. 3 and 4, each of the terminal insertion holes 30 is comprised of a first hole segment 30a having, for example, a rectangular or square shape in its cross section along the X-Y plane. The first hole segment 30a is comprised of a first pair of opposing inner wall surfaces 310a and 310b arranged parallel to the Y direction, and a second pair of opposing inner wall surfaces 311a and 311b perpendicular to the first pair of inner wall surfaces 310a and 310b; the inner wall surfaces 310a, 310b, 311a, and 311b constitute the first hole segment 30a thereamong.

Each of the terminal insertion holes 30 is also comprised of a second hole segment 30b having a rectangular thin shape in a cross section along the X-Y plane; the longitudinal direction of the rectangular-thin shaped second portion 30b is along the Y direction (see FIGS. 3 and 4). The second hole segment 30b is comprised of a pair of inner wall surfaces 320a and 320b located in parallel to the Y direction. That is, the inner wall surfaces 320a and 320b constitute the second hole segment 30b therebetween. The second hole segment 30b communicably extends from a middle portion of the inner wall surface 311a, which is closer to the second portion 30b than that of the inner wall surface 311b, toward the third portion 30c.

The second portion 30b has a width between the inner side walls 320a and 320b in the X direction, which is shorter than the length of the inner wall surface 311a in the X direction. In other words, the inner wall surfaces 320a and 320b are configured to protrude to be closer to each other in the X direction than the inner wall surfaces 310a and 310b are.

Each of the terminal insertion holes 30 is comprised of a third hole segment 30c having, for example, a rectangular or square shape in its cross section along the X-Y plane. The third hole segment 30c is comprised of a first pair of opposing inner wall surfaces 330a and 330b located in parallel to the Y direction, and a second pair of opposing inner wall surfaces 331a and 331b perpendicular to the first pair of inner wall surfaces 330a and 330b; the inner wall surfaces 330a, 330b, 331a, and 331b constitute the third hole segment 30c thereamong.

The third hole segment 30c communicably extends from the second hole segment 30b toward the AC terminal $22_A$ in the Y direction.

In other words, the second hole segment 30b is comprised of a pair of first and second protrusion portions $32_A$ and $32_B$ that face each other. The protrusion portion $32_A$ has the inner wall surface 320a as its end surface, and the protrusion portion $32_B$ has the inner wall surface 320b as its end surface. The first protrusion portion $32_A$ is configured to protrude in the X direction relative to the inner wall surfaces 310a and 330a toward the second protrusion portion $32_B$ with a clearance between the inner wall surfaces 320a and 320b of the respective first and second protrusion portions $32_A$ and $32_B$.

That is, the inner wall surfaces 320a and 320b of the respective first and second protrusion portions $32_A$ and $32_B$ define the second hole segment 30b therebetween, so that the wide end portion 24 of each narrow power terminal $22_W$ is filled in or held in the second hole segment 30b of the corresponding one of the terminal insertion holes 30. While the wide end portion 24 of each narrow power terminal $22_W$ is filled in or disposed in the second hole segment 30b of the corresponding one of the terminal insertion holes 30, the wide end portion 24 is welded to both the inner wall surfaces 320a and 320b.

Note that the wide end portion 24 of each narrow power terminal $22_W$ has a longitudinal length La in the Y direction, and the second hole segment 30b has a longitudinal length Lb in the Y direction; the length La is set to be longer than the length Lb.

The wide end portion 24 of each narrow power terminal $22_W$ has opposing first and second ends 241 and 242, the protrusion portion $32_A$ has both side edges 321 and 322, and the protrusion portion $32_B$ also has both side edges 321 and 322 in the Y direction. The side edges 321 and 322 of the first protrusion portion $32_A$ is located between the first and second ends 241 and 242 of the wide end portion 24. Similarly, the side edges 321 and 322 of the second protrusion portion $32_B$ are located between the first and second ends 241 and 242 of the wide end portion 24. Note that the side edges 321 of the respective first and second protrusion portions $32_A$ and $32_B$ constitute the inner wall surfaces 311a, and the side edges 322 of the respective first and second protrusion portions $32_A$ and $32_B$ constitute the inner wall surfaces 331a.

As illustrated in FIG. 3, the wide end portion 24 of each narrow power terminal $22_W$ is interposed between the first protrusion portion $32_A$ and the second protrusion portion $32_B$; the first and second protrusion portions $32_A$ and the second protrusion portion $32_B$ are located to be overlapped with each other via the wide end portion 24 in the X direction.

An unillustrated gap is present between the wide end portion 24 and each of the first and second protrusion portions $32_A$ and $32_B$ before a welding process between the wide end portion 24 and each of the first and second protrusion portions $32_A$ and $32_B$ is executed.

This allows the wide end portion 24 to be easily inserted between the first and second protrusion portions $32_A$ and $32_B$.

Execution of a welding process between the wide end portion 24 and each of the first and second protrusion portions $32_A$ and $32_B$ melts a part of the wide end portion 24 to fill the gap.

Note that the first embodiment is configured to perform the welding process between only one of the first protrusion portion $32_A$ and the second protrusion portion $32_B$ and the wide end portion 24.

The following describes how the power converter 1 of the first embodiment works and obtains technical benefits.

As illustrated in FIG. 1 and FIG. 2, at least one of the power terminals 22 is configured as the narrow power terminal $22_W$ that is comprised of the base portion 230, the narrow portion 23 and the wide end portion 24. That is, the width L2 of the narrow portion 23 of the narrow power terminal $22_W$ is smaller than the width L1 of each of the base portion 230 and the wide end portion 24 in the Y direction.

This configuration enables each narrow power terminal 22 to have an increased thermal resistance at the narrow portion 23. Accordingly, for joining the wide end portions 24 to the corresponding busbar 3 by, for example, welding during a manufacturing process of the power converter 1, heat is less likely to be transferred to the semiconductor elements 20 through the narrow power terminals $22_W$. This results in a reduction in disadvantageous variations in the characteristics of the semiconductor elements 20

The narrow portion 23 has lower rigidity due to the small length of the narrow portion 23 in the width direction.

Accordingly, even if external vibration is applied to the power converter 1, the narrow portion 23 is easily bent, so that large stress is less likely to be applied to the joint portions 7 between the busbar 3 and the narrow power terminals $22_W$ (see FIG. 3).

The above configuration that at least one of the power terminals 22 includes the narrow portion 23 makes it possible to (1) Reduce the length, i.e. the width, of the narrow power terminal $22_W$ in the Z direction, (2) Prevent transfer of heat to the semiconductor elements 20 during the joining process of the narrow power terminal $22_W$ to the corresponding busbar 3

(3) Prevent high stress from being applied to the joint portion 7 when vibrations are applied to the power converter 1

This therefore results in a reduction in a parasitic inductance in the narrow power terminal $22_W$, making it possible to prevent a huge surge from occurring from the semiconductor elements 20 when the semiconductor elements 20 are turned on or off.

Note that the power converter 1 of the first embodiment is specially configured such that each of the positive and negative power terminals $22_P$ and $22_N$ is comprised of the narrow portion 23 whereas the AC power terminal $22_A$ includes no narrow portion 23.

As illustrated in FIG. 1, the AC power terminal $22_A$ is longer than each of the positive and negative power terminals $22_P$ and $22_N$ in the Z direction, making it difficult to transfer heat to the semiconductor elements 20 during welding of the AC power terminal $22_A$ to the corresponding AC busbar $3_A$. Furthermore, because the AC power terminal $22_A$ is longer in the Z direction, the AC power terminal $22_A$ is likely to be bent when vibration is applied to the power converter 1, thus preventing high stress from being applied to the joint portion 7 connected to the AC busbar $3_A$.

As illustrated in FIG. 2, the wide end portion 24 of each of the positive and negative power terminals $22_P$ and $22_N$ is joined to the corresponding one of the positive and negative busbars $3_P$ and $3_N$. The wide end portion 24 has a length h in the Z direction, and at least a part of each of the positive and negative busbars $3_P$ and $3_N$, which is located to be adjacent to the wide end portion 24, has a length d in the Z direction; the length h is set to be longer than the length d.

This provides a sufficient contact area between the wide end portion 24 and each of the positive and negative busbars $3_P$ and $3_N$, making it possible to perform the joining process more easily.

As illustrated in FIG. 3, the second hole segment 30b is comprised of a pair of first and second protrusion portions $32_A$ and $32_B$ that face each other. The protrusion portion $32_A$ has the inner wall surface 320a as its end surface, and the protrusion portion $32_B$ has the inner wall surface 320b as its end surface. The first protrusion portion $32_A$ is configured to protrude in the X direction relative to the inner wall surfaces 310a and 330a toward the second protrusion portion $32_B$ with a clearance between the inner wall surfaces 320a and 320b of the respective first and second protrusion portions $32_A$ and $32_B$.

That is, the inner wall surfaces 320a and 320b of the respective first and second protrusion portions $32_A$ and $32_B$ define the second hole segment 30b therebetween, so that the wide end portion 24 of each narrow power terminal $22_W$ is filled in or inserted in the second hole segment 30b of the corresponding one of the terminal insertion holes 30. While the wide end portion 24 of each narrow power terminal $22_W$ is filled in or disposed in the second hole segment 30b of the corresponding one of the terminal insertion holes 30, the wide end portion 24 is welded to both the inner wall surfaces 320a and 320b.

Note that the wide end portion 24 of each narrow power terminal $22_W$ has a longitudinal length La in the Y direction, and the second hole segment 30b has a longitudinal length Lb in the Y direction; the length La is set to be longer than the length Lb.

The wide end portion 24 of each narrow power terminal $22_W$ has opposing first and second ends 241 and 242, the protrusion portion $32_A$ has both side edges 321 and 322, and the protrusion portion $32_B$ also has both side edges 321 and 322. The side edges 321 and 322 of the first protrusion portion $32_A$ is located between the first and second ends 241 and 242 of the wide end portion 24. Similarly, the side edges 321 and 322 of the second protrusion portion $32_B$ is located between the first and second ends 241 and 242 of the wide end portion 24

This enables an increase in the contact area between each of the end surfaces 320a and 320b and the wide end portion 24, thus making it possible to perform the welding process more easily.

Furthermore, when vibration is applied to the power converter 1, concentration of stress at the joint portion 7 can be suppressed.

Figure 14:
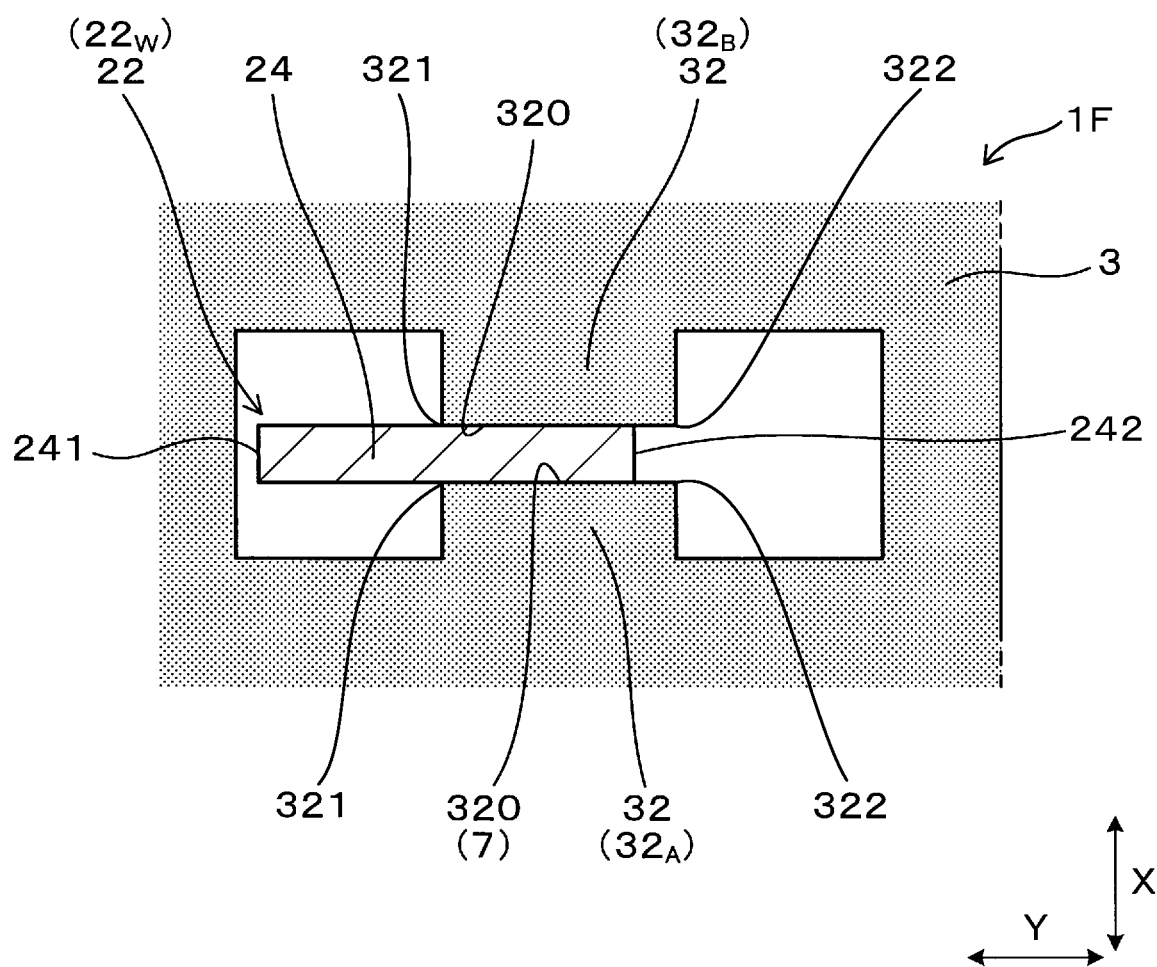
FIG. 14 is an enlarged plane view of principal components of a power converter according to the seventh embodiment of the present disclosure.

That is, as illustrated in FIG. 14 described later, the side edge 321 of each protrusion portion 32 can be only located between the first and second ends 241 and 242 of the wide end portion 24. However, this may result in a reduction in the contact area between each protrusion portion 32 and the wide end portion 24.

Furthermore, application of vibrations to the power converter may cause stress to concentrate at the joint portion 7.

In contrast, the power converter 1 of the first embodiment is configured such that the side edges 321 and 322 of each protrusion portion 32 are both located between the first and second ends 241 and 242 of the wide end portion 24 in the Y direction as illustrated in FIG. 3. This configuration results in an increase in the contact area between each protrusion portion 32 and the wide end portion 24, making it possible to perform the welding process easier and to prevent high stress from being applied to the joint portion 7 upon vibrations being applied to the power converter 1.

As illustrated in FIG. 3, the wide end portion 24 of each narrow power terminal $22_W$ is interposed between the first protrusion portion $32_A$ and the second protrusion portion $32_B$; the first and second protrusion portions $32_A$ and the second protrusion portion $32_B$ are located to be overlapped with each other via the wide end portion 24 in the X direction. This configuration enables the wide end portion 24 to be sandwiched, i.e. directly supported, between the first and second protrusion portions $32_A$ and $32_B$, thus making it possible to perform the welding process further easier.

As illustrated in FIG. 2, each of the narrow power terminals $22_W$, i.e. each of the positive and negative power terminals $22_P$ and $22_N$, is comprised of (1) The first groove $25_A$ formed in one of the minor sides 22s2 of the corresponding narrow power terminal $22_W$ located to be closer to the overlap portions 30 than the other thereof is (2) The second groove $25_B$ formed in the other of the minor sides 22s2 of the corresponding narrow power terminal $22_W$ That is, the first and second grooves $25_A$ and $25_B$ constitute the narrow portion 23 therebetween in the Y direction.

Adjustment of the length of each of the first and second grooves $25_A$ and $25_B$ enables the length of the narrow portion 23 in the Y direction to be easily adjusted.

This facilitates adjustment of thermal resistance and rigidity of the narrow power terminal $22_W$.

Figure 12:
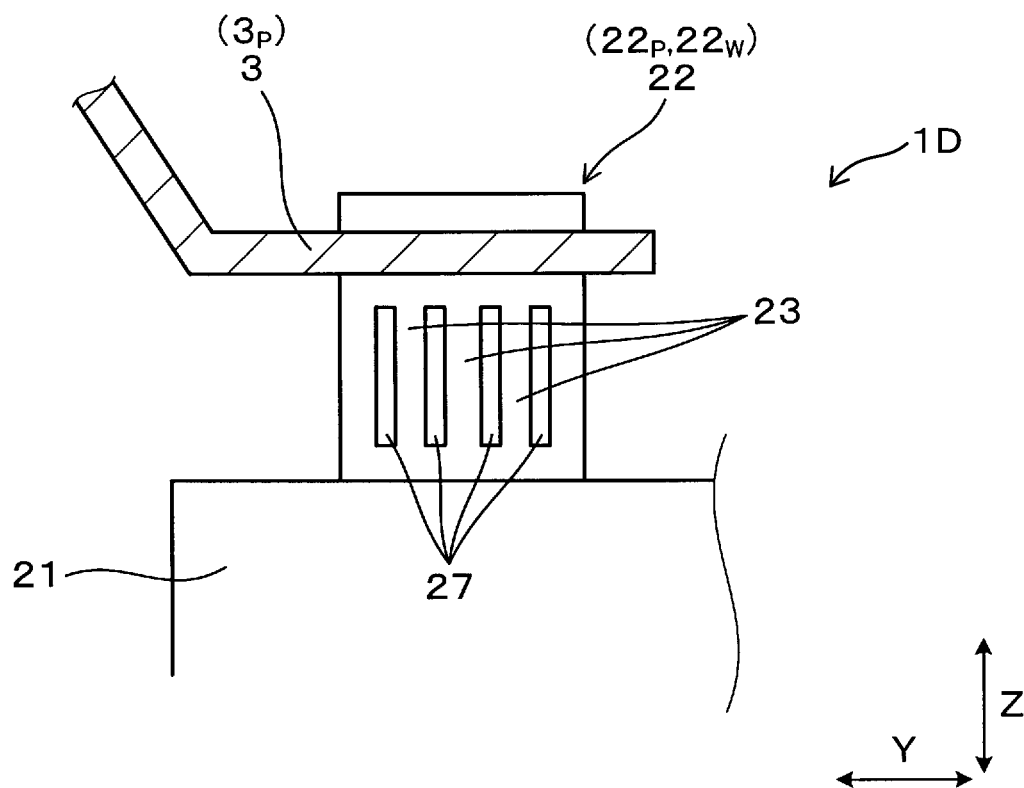
FIG. 12 is an enlarged cross-sectional view of principal components of a power converter according to the fifth embodiment of the present disclosure.

As illustrated in FIG. 12 described later, slits 27 can be formed through the narrow portion 23 instead of the first and second grooves $25_A$ and $25_B$. However, in this case, the narrow power terminal $22_W$ has a larger surface area, and therefore may be likely to dissipate welding heat, resulting in welding being slightly difficult.

However, this configuration of the power converter 1 including the first and second grooves $25_A$ and $25_B$ formed through the narrow portion 23 prevents an increase in surface area of the narrow portion 23, making it possible to suppress dissipation of welding heat, thus facilitating the welding process.

As described above, the first embodiment provides the power converter 1, which is capable of (1) Reducing transfer of heat to the semiconductor elements 20 included in each semiconductor module 2

(2) Reducing transfer of stress to the joint portions between the narrow power terminal $22_W$ and the corresponding busbar 3

Note that, in the first embodiment, the welding process is executed on the narrow power terminals $22_W$ and the corresponding busbar 3 to join the narrow power terminals $22_W$ and the corresponding busbar 3 to each other. However, the present disclosure is not limited to this. For example, soldering can be used for joining the narrow power terminals $22_W$ and the corresponding busbar 3 to each other.

Second Embodiment

Figure 9:
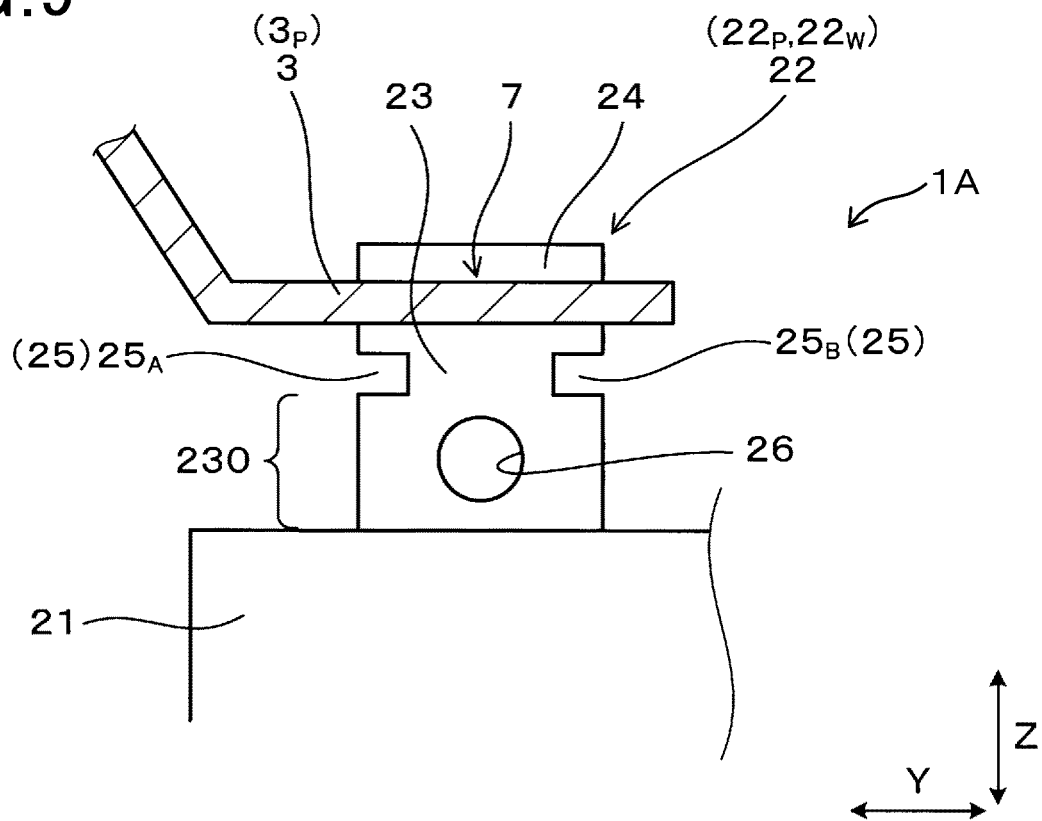
FIG. 9 is an enlarged cross-sectional view of principal components of a power converter according to the second embodiment of the present disclosure.

The following describes the second embodiment of the present disclosure with reference to FIG. 9. The configuration and functions of a power converter 1A according to the second embodiment are mainly different from those of the power converter 1 according to the first embodiment by the following points. The following therefore mainly describes the different points.

The power converter 1A of the second embodiment is configured such that the shape of the narrow power terminal $22_W$ is changed.

As illustrated in FIG. 9, the base portion 230 of the narrow power terminal $22_W$ has a through-hole 26 formed therethrough in the X direction.

This configuration enables an increase in thermal resistance of the base portion 230.

Thus, heat resulting from the welding process or the like is less likely to be transferred through the narrow power terminal $22_W$, preventing the characteristics of the semiconductor elements 20 from varying due to the heat.

Furthermore, the rigidity of the base portion 230 can be reduced, enabling the base portion 230 to be bent more easily when external vibration is applied to the power converter 1A.

Accordingly, exertion of high stress on the joint portion 7 can be more appropriately suppressed.

Third Embodiment

Figure 10:
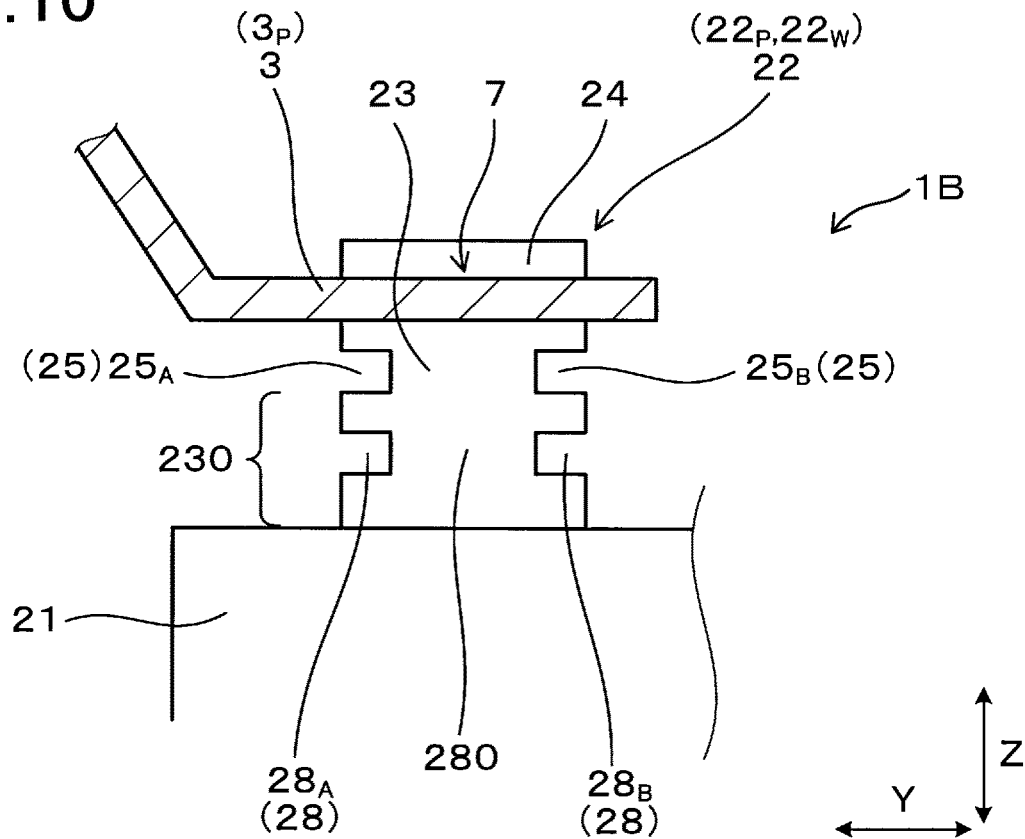
FIG. 10 is an enlarged cross-sectional view of principal components of a power converter according to the third embodiment of the present disclosure.

The following describes the third embodiment of the present disclosure with reference to FIG. 10. The configuration and functions of a power converter 1B according to the third embodiment are mainly different from those of the power converter 1 according to the first embodiment by the following points. The following therefore mainly describes the different points.

The power converter 1B of the third embodiment is configured such that the shape of the narrow power terminal $22_W$ is changed.

As illustrated in FIG. 10, the narrow power terminal $22_W$ of the third embodiment is further comprised of (1) A first auxiliary groove $28_A$ formed in one of the minor sides $22s2$ of the base portion 260 located to be closer to the overlap portions 30 than the other thereof is (2) A second auxiliary groove $28_B$ formed in the other of the minor sides $22s2$ of the base portion 260

Each of the first and second auxiliary grooves $28_A$ and $28_B$ is located between the converter component 21 and the corresponding one of the first and second grooves $25_A$ and $25_B$.

Each of the first and second auxiliary grooves $28_A$ and $28_B$ extends in the X direction, and has a substantially rectangular shape in a cross section along the Y-Z plane.

The opening of the first auxiliary cutout portion $28_A$ is directed toward the overlap portions 30 of the positive and negative busbars $3_P$ and $3_N$ in the Y direction, and the opening of the second auxiliary groove $28_B$ is directed toward the AC terminal $22_A$ in the Y direction.

That is, the first and second auxiliary grooves $28_A$ and $28_B$ constitute an auxiliary narrow portion 28, whose length in the Y direction is shorter than that of the wide end portion 25 in the Y direction, therebetween in the Y direction.

This configuration enables a further increase in thermal resistance of the base end portion 230.

Thus, heat resulting from the welding process or the like is less likely to be transferred through the narrow power terminal $22_W$.

Accordingly, this configuration appropriately prevents the characteristics of the semiconductor elements 20 from varying due to the heat.

Furthermore, formation of the auxiliary grooves $28_A$ and $28_B$ enables a reduction in the rigidity of the base end portion 230.

Thus, the base end portion 230 can be easily bent when external vibration is applied to the power converter 1B, allowing suppression of exertion of high stress on the joint portion 7.

Fourth Embodiment

Figure 11:
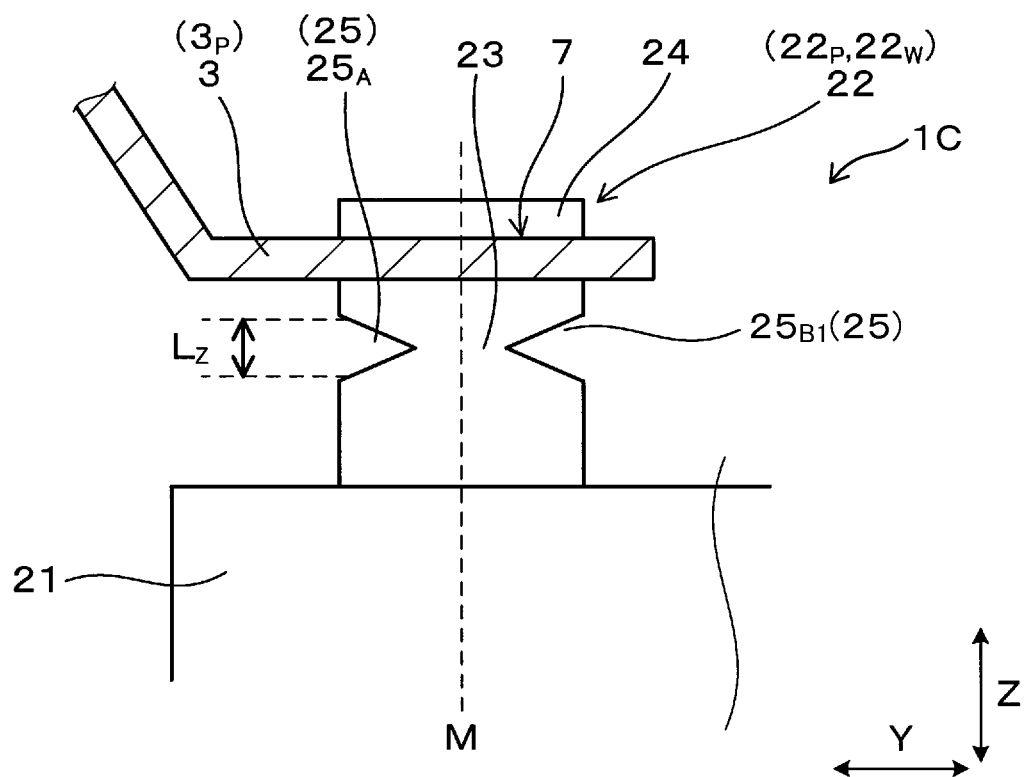
FIG. 11 is an enlarged cross-sectional view of principal components of a power converter according to the fourth embodiment of the present disclosure.

The following describes the fourth embodiment of the present disclosure with reference to FIG. 11. The configuration and functions of a power converter 1C according to the fourth embodiment are mainly different from those of the power converter 1 according to the first embodiment by the following points. The following therefore mainly describes the different points.

The power converter 1C of the fourth embodiment is configured such that the shape of the narrow power terminal $22_W$ is changed.

As illustrated in FIG. 11, each of the narrow power terminals $22_W$, i.e. each of the positive and negative power terminals $22_P$ and $22_N$, is comprised of (1) A first groove $25_{A1}$ formed in one of the minor sides $22s2$ of the corresponding narrow power terminal $22_W$ located to be closer to the overlap portions 30 than the other thereof is (2) A second groove $25_{B1}$ formed in the other of the minor sides $22s2$ of the corresponding narrow power terminal $22_W$ The first and second grooves $25_{A1}$ and $25_{B1}$ constitute the narrow portion 23 therebetween in the Y direction.

Each of the first and second grooves $25_{A1}$ and $25_{B1}$ extends in the X direction, and has a substantially taper shape in a cross section along the Y-Z plane. That is, each of the first and second grooves $25_{A1}$ and $25_{B1}$ has a length $L_Z$ in the Z direction decreasing gradually toward a central portion M of the narrow power terminal $22_W$ in the Y direction. In other words, the shape of each of the first and second grooves $25_{A1}$ and $25_{B1}$ along the Y-Z plane is tapered gradually toward the central portion M of the narrow power terminal $22_W$ in the Y direction.

Fifth Embodiment

The following describes the fifth embodiment of the present disclosure with reference to FIG. 12. The configuration and functions of a power converter 1D according to the fifth embodiment are mainly different from those of the power converter 1 according to the first embodiment by the following points. The following therefore mainly describes the different points.

The power converter 1D of the fifth embodiment is configured such that the shape of the narrow power terminal $22_W$ is changed.

As illustrated in FIG. 12, the narrow power terminal $22_W$ has a plurality of slits 27 formed therethrough in the X direction.

Each of the slits 27 has an elongated shape in the Z direction.

Portions of the narrow portion 23 between the individual slits 27 constitute the narrow portion 23 therebetween in the Y direction.

Sixth Embodiment

Figure 13:
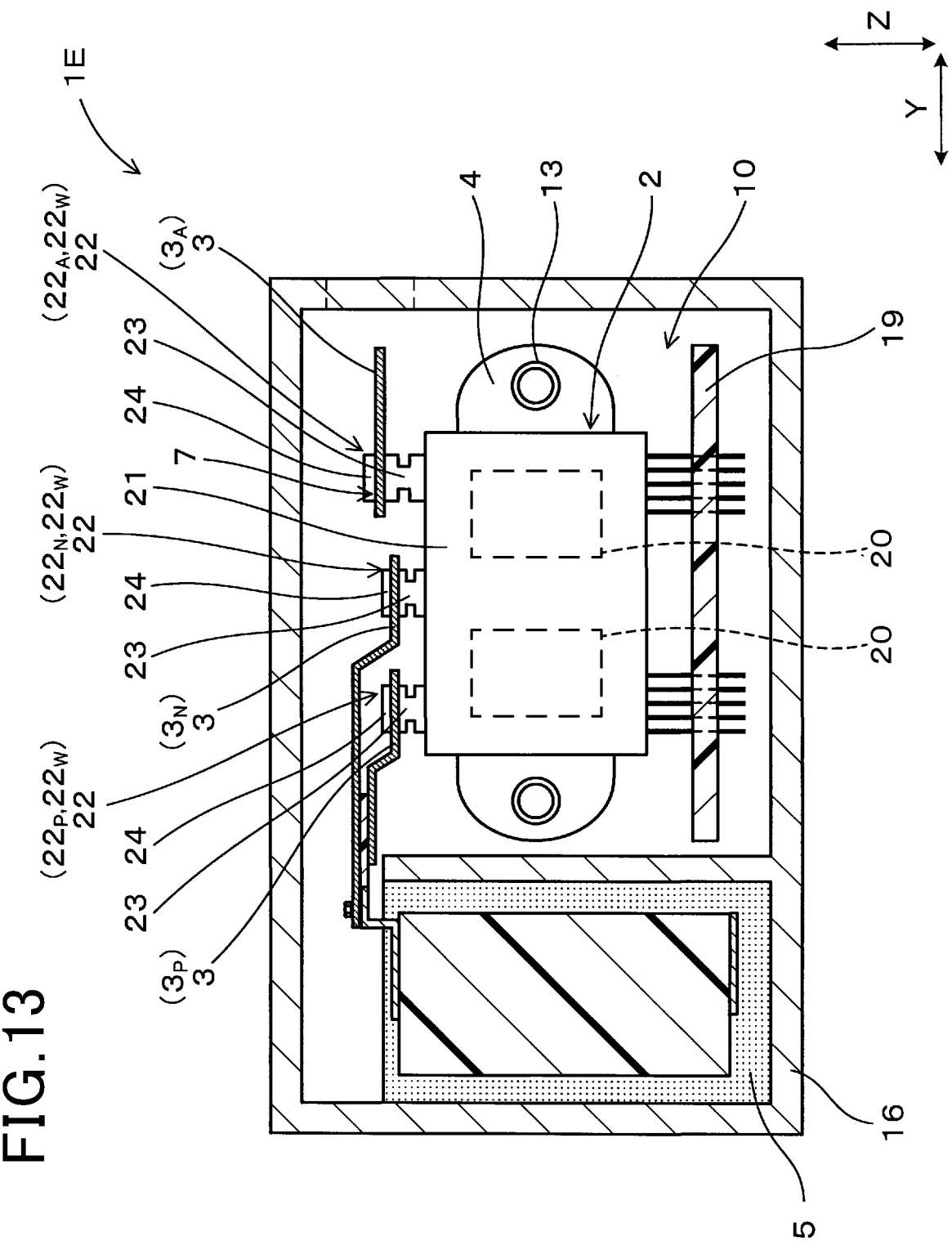
FIG. 13 is a cross-sectional view of a power converter according to the sixth embodiment of the present disclosure.

The following describes the sixth embodiment of the present disclosure with reference to FIG. 13. The configuration and functions of a power converter 1E according to the sixth embodiment are mainly different from those of the power converter 1 according to the first embodiment by the following points. The following therefore mainly describes the different points.

The power converter 1E of the sixth embodiment is configured such that the number of the narrow power terminals $22_W$ is changed.

As illustrated in FIG. 13, all the power terminals 22 of the semiconductor module 2 are configured as the narrow power terminals $22_W$.

That is, the narrow portion 23 is formed in each of the positive power terminals $22_P$, the negative power terminal $22_N$, and the AC power terminals $22_A$.

Accordingly, these power terminals 22 are all represented as the narrow power terminals $22_W$.

In this configuration, the narrow portion 23 formed in the AC power terminal $22_A$ enables a reduction in the rigidity of the AC power terminal $22_A$.

This prevents high stress from being applied to the joint portions between the AC bus bar $3_A$ and the AC power terminals $22_A$ upon external vibrations being applied to the power converter 1E.

Seventh Embodiment

The following describes the seventh embodiment of the present disclosure with reference to FIG. 14. The configuration and functions of a power converter 1F according to the seventh embodiment are mainly different from those of the power converter 1 according to the first embodiment by the following points. The following therefore mainly describes the different points.

The power converter 1F of the seventh embodiment is configured such that the positional relationship between the wide end portion 24 and the protrusion portion 32 is changed.

As illustrated in FIG. 14, the side edge 321 of the side edges 321 and 322 of the protrusion portion 32 is located between the first and second ends 241 and 242 of the wide end portion 24 in the Y direction.

The other side edge 322 is not located between the first and second ends 241 and 242 of the wide end portion 24 in the Y direction.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:
1. A power converter comprising:
   a semiconductor module comprising:
      a converter component that includes at least one semiconductor element for power conversion; and
      a plurality of power terminals protruding from the converter component in a first direction serving as a protrusion direction, and each having a predetermined thickness in a second direction serving as a thickness direction; and
   a plurality of busbars connected to the respective power terminals,
   the power terminals including at least one narrow power terminal, the at least one narrow power terminal comprising:
      a first portion having a first thermal resistance and a first rigidity; and
      a second portion having a second thermal resistance and a second rigidity, the second thermal resistance being higher than the first thermal resistance, the second rigidity being smaller than the first rigidity,
   wherein:
   the at least one narrow power terminal comprises:
      a wide end portion serving as the first portion; and
      a narrow portion serving as the second portion,
   the narrow portion being located to be closer to the converter component than the wide end portion is in the protrusion direction,
   the wide end portion having a first length in a third direction serving as a width direction perpendicular to the protrusion direction and the thickness direction, the narrow portion having a second length in the width direction, the second length being shorter than the first length, the wide end portion of the at least one narrow power terminal being joined to a corresponding at least one of the busbars,
   the corresponding at least one busbar includes a joint portion joined to the wide end portion of the at least one narrow power terminal;

the joint portion of the corresponding at least one busbar has a terminal insertion hole formed therethrough in the protrusion direction;

the wide end portion of the at least one narrow power terminal is filled in the terminal insertion hole of the joint portion of the corresponding at least one busbar;

the terminal insertion hole comprises:
  an inner wall surface; and
  a protrusion portion protruding from the inner wall surface toward the wide end portion;

the protrusion portion has an end surface in the protrusion direction, so that the wide end portion filled in the terminal insertion hole is welded to the end surface of the protrusion portion;

the wide end portion has opposing first and second ends in the width direction; and the protrusion portion has opposing side edges in the thickness direction; and the side edges are located between the first and second ends of the wide end portion in the thickness direction.

2. The power converter according to claim 1, wherein:
the joint portion of the corresponding at least one busbar has a thickness in a direction corresponding to the protrusion direction;
the wide end portion has a length in the protrusion direction; and
the length of the wide end portion in the protrusion direction is longer than the thickness of the joint portion of the corresponding at least one busbar.

3. The power converter according to claim 1, wherein
the protrusion portion comprises first and second protrusion portions located across the wide end portion in the thickness direction; and
the wide end portion is interposed between the first and second protrusion portions.

4. The power converter according to claim 1, wherein:
the at least one narrow power terminal further comprises:
  a base portion located to be closer to the converter component than the narrow portion,
wherein the base portion has a through hole formed therethrough.

5. The power converter according to claim 1, wherein:
the at least one narrow power terminal further comprises:
  a plurality of slits formed therethrough in the thickness direction.

6. A power converter comprising:
a semiconductor module comprising:
  a converter component that includes at least one semiconductor element for power conversion; and
  a plurality of power terminals protruding from the converter component in a first direction serving as a protrusion direction, and each having a predetermined thickness in a second direction serving as a thickness direction; and
a plurality of busbars connected to the respective power terminals,
the power terminals including at least one narrow power terminal, the at least one narrow power terminal comprising:
  a first portion having a first thermal resistance and a first rigidity; and
  a second portion having a second thermal resistance and a second rigidity, the second thermal resistance being higher than the first thermal resistance, the second rigidity being smaller than the first rigidity,
wherein:
the at least one narrow power terminal comprises:
  a wide end portion serving as the first portion; and
  a narrow portion serving as the second portion,
the narrow portion being located to be closer to the converter component than the wide end portion is in the protrusion direction,
the wide end portion having a first length in a third direction serving as a width direction perpendicular to the protrusion direction and the thickness direction, the narrow portion having a second length in the width direction, the second length being shorter than the first length, the wide end portion of the at least one narrow power terminal being joined to a corresponding at least one of the busbars,
the at least one narrow power terminal has opposing sides in the width direction; and
the at least one narrow power terminal comprises:
  a first groove formed in one of the sides of the corresponding narrow power terminal and extending in the thickness direction, the first groove having an opening directed toward a first side of the thickness direction;
  a second groove formed in the other of the sides of the corresponding narrow power terminal and extending in the thickness direction; and
  the first and second grooves constitute the narrow portion therebetween in the thickness direction.

7. The power converter according to claim 6, wherein:
the at least one narrow power terminal includes:
  a portion located between the converter component and the first and second grooves in the protrusion direction; and
  a through hole formed though the portion of the narrow terminal in the thickness direction.

8. The power converter according to claim 6, wherein:
each of the first and second grooves is tapered toward a middle of the corresponding narrow power terminal in the width direction.

9. The power converter according to claim 6, wherein:
the at least one narrow power terminal further comprises:
  a base portion located to be closer to the converter component than the narrow portion,
wherein the base portion has a through hole formed therethrough.

10. The power converter according to claim 6, wherein:
the at least one narrow power terminal further comprises:
  a plurality of slits formed therethrough in the thickness direction.

11. The power converter according to claim 6, wherein:
the joint portion of the corresponding at least one busbar has a thickness in a direction corresponding to the protrusion direction;
the wide end portion has a length in the protrusion direction; and
the length of the wide end portion in the protrusion direction is longer than the thickness of the joint portion of the corresponding at least one busbar.

12. A power converter comprising:
a semiconductor module comprising:
  a converter component that includes at least one semiconductor element for power conversion; and
  a plurality of power terminals protruding from the converter component in a first direction serving as a protrusion direction, and each having a predetermined thickness in a second direction serving as a thickness direction; and
a plurality of busbars connected to the respective power terminals, the power terminals including at least one narrow power terminal, the at least one narrow power terminal comprising:
- a first portion having a first thermal resistance and a first rigidity; and
- a second portion having a second thermal resistance and a second rigidity, the second thermal resistance being higher than the first thermal resistance, the second rigidity being smaller than the first rigidity, wherein:

the at least one narrow power terminal comprises:
- a wide end portion serving as the first portion; and
- a narrow portion serving as the second portion, the narrow portion being located to be closer to the converter component than the wide end portion is in the protrusion direction, the wide end portion having a first length in a third direction serving as a width direction perpendicular to the protrusion direction and the thickness direction, the narrow portion having a second length in the width direction, the second length being shorter than the first length, the wide end portion of the at least one narrow power terminal being joined to a corresponding at least one of the busbars, the at least one narrow power terminal further comprises:
- a base portion located to be closer to the converter component than the narrow portion, wherein:
- the at least one narrow power terminal has opposing sides in the width direction; and
- the at least one narrow power terminal comprises:
  - a first auxiliary groove formed in one of the sides of the base portion of the corresponding narrow power terminal and extending in the thickness direction, the first auxiliary groove having an opening directed toward a first side of the thickness direction; and
  - a second auxiliary groove formed in the other of the sides of the base portion of the corresponding narrow power terminal and extending in the thickness direction.

13. The power converter according to claim 12, wherein:
the at least one narrow power terminal further comprises:
- a plurality of slits formed therethrough in the thickness direction.

14. The power converter according to claim 12, wherein:
the joint portion of the corresponding at least one busbar has a thickness in a direction corresponding to the protrusion direction;
the wide end portion has a length in the protrusion direction; and
the length of the wide end portion in the protrusion direction is longer than the thickness of the joint portion of the corresponding at least one busbar.

* * * * *